US010774267B2

(12) United States Patent
Phan et al.

(10) Patent No.: US 10,774,267 B2
(45) Date of Patent: Sep. 15, 2020

(54) METHOD AND DEVICE FOR CONVERTING MUNICIPAL WASTE INTO ENERGY

(71) Applicants: Kevin Phan, San Jose, CA (US); Hoa Huynh, Duc Trong (VN); Chau Luu, Seattle, WA (US)

(72) Inventors: Kevin Phan, San Jose, CA (US); Hoa Huynh, Duc Trong (VN); Chau Luu, Seattle, WA (US)

( * ) Notice: Subject to any disclaimer, the term of this patent is extended or adjusted under 35 U.S.C. 154(b) by 1098 days.

(21) Appl. No.: 14/949,860

(22) Filed: Nov. 23, 2015

(65) Prior Publication Data

US 2016/0146105 A1    May 26, 2016

Related U.S. Application Data

(60) Provisional application No. 62/082,678, filed on Nov. 21, 2014.

(51) Int. Cl.
| | |
|---|---|
| *C10B 53/07* | (2006.01) |
| *C10B 57/02* | (2006.01) |
| *B09B 5/00* | (2006.01) |
| *C10B 53/02* | (2006.01) |
| *B09B 3/00* | (2006.01) |
| *C10L 3/08* | (2006.01) |

(52) U.S. Cl.
CPC ............ *C10B 53/07* (2013.01); *B09B 3/00* (2013.01); *B09B 5/00* (2013.01); *C10B 53/02* (2013.01); *C10B 57/02* (2013.01); *C10L 3/08* (2013.01); *Y02E 50/14* (2013.01); *Y02P 20/143* (2015.11)

(58) Field of Classification Search
CPC .................................. C10J 3/00; C10J 3/721
See application file for complete search history.

(56) References Cited

U.S. PATENT DOCUMENTS

| | | | |
|---|---|---|---|
| 3,853,498 A | 12/1974 | Bailie | |
| 4,422,858 A * | 12/1983 | Weber | ........................ C10J 3/02 |
| | | | 252/373 |
| 4,511,370 A | 4/1985 | Hunziker et al. | |
| 8,604,088 B2 | 12/2013 | Lucas et al. | |
| 8,614,257 B2 | 12/2013 | Lucas et al. | |
| 2005/0247553 A1 * | 11/2005 | Ichikawa | .................... C10J 3/66 |
| | | | 202/96 |
| 2009/0265987 A1 * | 10/2009 | Xu | ........................... C10J 3/482 |
| | | | 48/89 |
| 2009/0305390 A1 | 12/2009 | Cacho et al. | |
| 2011/0008865 A1 | 1/2011 | Lee | |

(Continued)

FOREIGN PATENT DOCUMENTS

JP           11092127 A  *  4/1999

*Primary Examiner* — Matthew J Merkling

(57) ABSTRACT

A method and device for converting municipal waste into energy. This method involves heating the waste in multiple sections of a chamber to produce syngas and biochar. The syngas is removed with a vacuum pump and the biochar advances to the next section and is heated to a higher temperature to release more syngas. All of the collected syngas is then transferred to a bio-reactor that removes dangerous carbon monoxide from the syngas mixture by combining the syngas with hydrogen, causing the carbon monoxide to react with the hydrogen and produce methane and water. The resulting syngas can then be used for electricity production or stored as dimethyl ether.

8 Claims, 2 Drawing Sheets

(56) References Cited

U.S. PATENT DOCUMENTS

| | | | |
|---|---|---|---|
| 2012/0256129 A1* | 10/2012 | Bell | C10J 3/86 |
| | | | 252/373 |
| 2013/0239479 A1* | 9/2013 | Gao | C10B 49/10 |
| | | | 48/89 |
| 2014/0102000 A1* | 4/2014 | Haube | C10J 3/02 |
| | | | 48/111 |
| 2014/0223908 A1* | 8/2014 | Sweeney | F01K 23/067 |
| | | | 60/645 |
| 2015/0044106 A1* | 2/2015 | Li | B01J 19/243 |
| | | | 422/186.22 |
| 2015/0247636 A1* | 9/2015 | Einarsson | F23G 5/442 |
| | | | 110/346 |
| 2017/0145314 A1* | 5/2017 | Parkinson | B65G 33/14 |
| 2018/0291275 A1* | 10/2018 | Goodrich | C10B 33/02 |
| 2018/0305627 A1* | 10/2018 | Tsiava | C10J 3/503 |
| 2019/0078031 A1* | 3/2019 | Berends | C10J 3/487 |

\* cited by examiner

मेथड AND DEVICE FOR CONVERTING MUNICIPAL WASTE INTO ENERGY

METHOD AND DEVICE FOR CONVERTING MUNICIPAL WASTE INTO ENERGY

CROSS REFERENCE TO RELATED APPLICATIONS

This application claims the benefit of U.S. Provisional Application No. 62/082,678 filed on Nov. 21, 2014. The above identified patent application is herein incorporated by reference in its entirety to provide continuity of disclosure.

BACKGROUND OF THE INVENTION

The present invention relates to a method and a device for converting municipal waste into energy. More specifically, the present invention uses a chamber with a series of heating sections to convert waste into synthetic gas, or syngas, using the pyrolysis and gasification methods. The syngas is then treated with hydrogen to remove any toxic carbon monoxide gas from the syngas mixture.

There is a rising rate of industrial production in the economy, which presents two major obstacles. The first obstacle is finding and using energy efficiently in order to supply the vast amounts of energy required for the production of goods. It is important to have sufficient energy available for use, and finding environmentally safe methods of energy production is necessary to sustain a healthy global environment. The second major obstacle is the increasing amount of waste that requires disposal in a safe and efficient manner. Much of the world's waste is dumped in landfills, where the waste often sits in a pile so deep that items which can otherwise decompose are unable to do so. Furthermore, a considerable amount of waste, such as plastics, does not biodegrade even in favorable conditions.

There are a number of methods which are currently in use that actively decompose waste. Pyrolysis, gasification, anaerobic digestion and incineration are known technologies that are used in waste management. Each one of these processes uses an increasing amount of heat to break down the waste into useable energy. The main advantage of pyrolysis and gasification is the ability to break down waste efficiently with a lower level of heat than traditional incineration, which is accomplished by heating up the waste in the absence of oxygen. However, these methods themselves require fuel to produce the heat.

There are methods known in the prior art that produce ethanol from solid waste, and methods that uses anaerobic digestion to produce methane. However, these methods require a high percentage of organic material, and require a significant amount of external fuel to decompose the waste.

SUMMARY OF THE INVENTION

In view of the foregoing disadvantages inherent in the known types of methods for converting waste to energy now present in the prior art, the present invention provides a method of converting waste to energy using pyrolysis and gasification. The present system comprises a heating chamber, multiple heating sections, a vacuum pump, a bio-reactor and a hydrogen generator.

Municipal solid waste is first sorted and fed into a first heating section of a chamber where it is heated up to a temperature capable of pyrolysis. This heating produces syngas, a synthetic gas that is made up of carbon monoxide, carbon dioxide, and hydrogen, and biochar, a charcoal byproduct. The syngas is removed from the heating section with the vacuum pump and the biochar advances to the next heating section where is it heated to a higher temperature capable of gasification. This second heating process creates more syngas with additional biochar byproduct. The syngas is once again removed using the vacuum pump.

The next stage of the invention is to remove the toxic carbon monoxide from the syngas mixture that has been collected. The syngas is substantially made up of carbon monoxide, carbon dioxide and hydrogen. The carbon monoxide removal is accomplished by introducing additional hydrogen to the mixture, causing the carbon monoxide to react with the hydrogen and produce methane and water. The altered syngas is then ready to be used for electricity production or stored as dimethyl ether.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
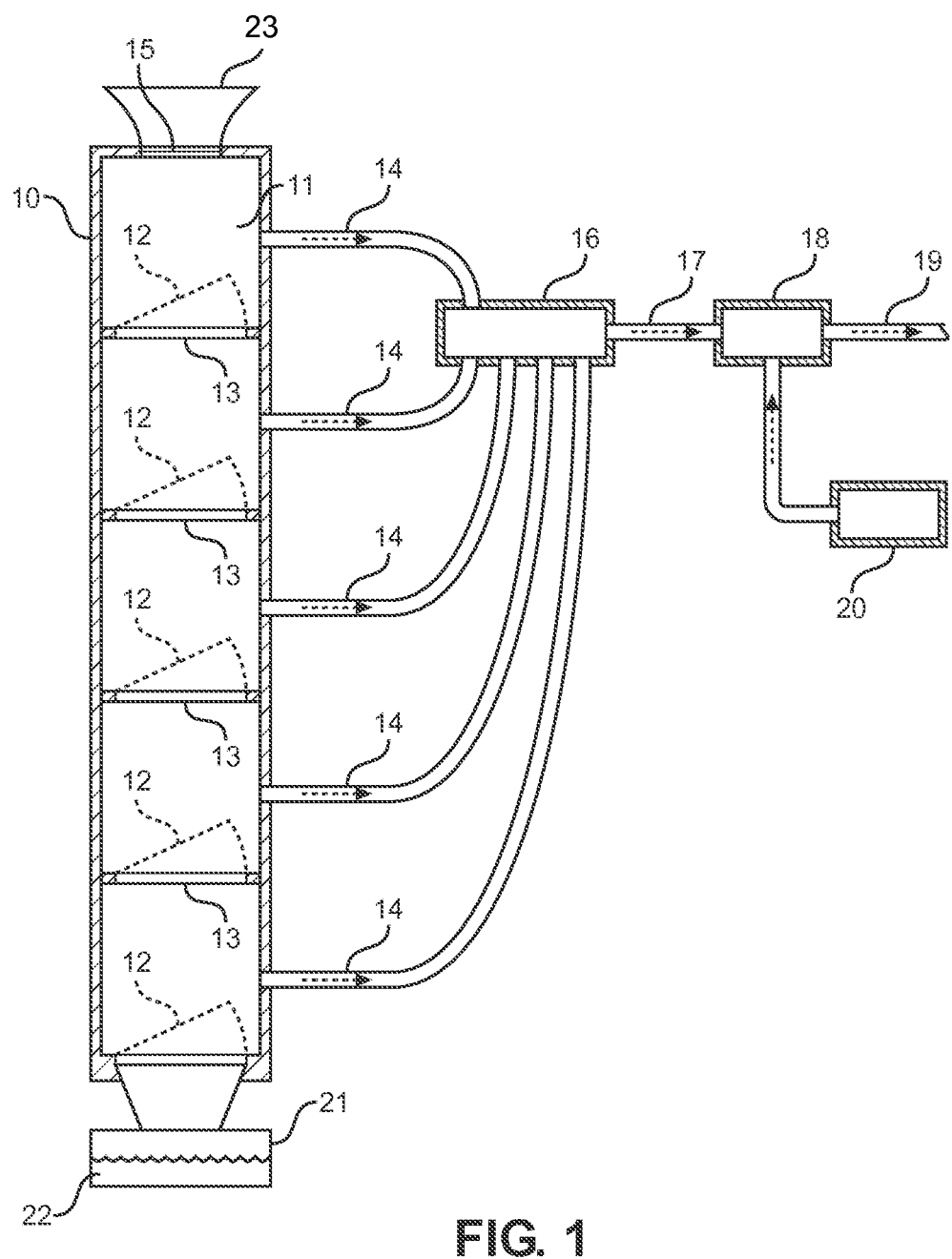
FIG. 1 shows a perspective view of an embodiment of the invention.

Reference is made herein to the attached drawings. Like reference numerals are used throughout the drawings to depict like or similar elements of the method and device for converting municipal waste into energy. The figures are intended for representative purposes only and should not be considered to be limiting in any respect.

Referring now to FIG. 1, there is shown a perspective view of one embodiment of the invention. The invention comprises a heating chamber 10 having multiple heating sections 11 placed therein. Each heating section 11 has an insulated interior and an opening 13 with a door 12. The heating sections 11 are constructed from material that can withstand temperatures upward of 1,500 degrees Celsius. In one embodiment of the invention, the heating sections 11 are stacked vertically in the chamber. The door 12 of each heating section 11 is placed at the bottom of the heating section 11, allowing the waste to be transferred by opening the door 12 and allowing the waste to fall below to the next heating section 11. In one embodiment of the invention, the doors 12 are controlled automatically via a microprocessor, which is programmed to open the door 12 by means of a mechanism when the interior of the heating section 11 reaches a threshold temperature. In another embodiment of the invention, the doors 12 are controlled manually by an operator, either through a manual mechanism or an electronic switch controlled by the operator.

In one embodiment of the invention there is a loading hopper 23, a first heating section 11 and a second heating section 11. In another embodiment of the invention, there are additional heating sections 11. For example, the heating chamber can contain five heating sections 11, wherein each section 11 is heated to a temperature that is higher than the heating section preceding it. Syngas is produced in the heating section 11 and removed with a vacuum pump 16, and the remaining biochar is moved to the following heating section 11.

After the biochar has traversed all of the heating chambers 11, and all of the potential syngas has been removed via the vacuum pump 16, the remaining biochar is transferred to a biochar storage tank 21. The biochar storage tank 21 is filled with water 22 to cool the biochar and allow that biochar to be stored safely.

The heating sections 11 are in fluid communication with a vacuum pump 16. In one embodiment of the invention, a first end of a pipe 14 extends from a heating section 11 and a second end thereof is connected to the vacuum pump 16. The vacuum pump 16 is in fluid communication with a bio-reactor 18 via one or more pipes 17 connected therebetween. The bio-reactor 18 is configured to receive syngas from the vacuum pump 16 once it has been transferred out of the heating sections. In the illustrated embodiment, the bio-reactor further receives hydrogen from a hydrogen generator 20. In one embodiment of the invention, the hydrogen received is $H_2$ and the syngas received is primarily composed of carbon monoxide (CO) and carbon dioxide ($CO_2$). The hydrogen reacts with the CO of the syngas in the bio-reactor to create the following chemical reaction: $CO+3H_2 \rightarrow CH_4+H_2O$. The output is methane ($CH_4$) and water ($H_2O$). In addition to creating methane and water, the output syngas can additionally be converted into dimethyl ether (DME) $C_2H_6O$ ($CH_3$—O—$CH_3$). The output is transferred to an external storage tank through a final pipe 19.

In one embodiment of the invention, the fuel used to heat the heating sections 11 is both propane gas and syngas. Propane gas is used to slowly heat up the heating sections 11 at the beginning of the process. After the heating sections have reached a sufficient temperature to start producing syngas, a smaller first portion of the produced syngas is then used as fuel for the heating sections 11, while a larger second portion of the syngas output is used for electricity production. For example, 20% of the produced syngas can be recirculated to heat the heating sections, and the remaining 80% of the produced syngas is stored and used in the production of electricity. For example, electricity can be generated by using the syngas to heat a substance, such as water, that creates steam, which is then forced through a turbine connected to an electrical generator. In this embodiment of the invention, the process is self-fueled after the initial startup. The recirculated syngas is transferred back to the heating chamber via piping that is connected to the bio-reactor.

Figure 2:
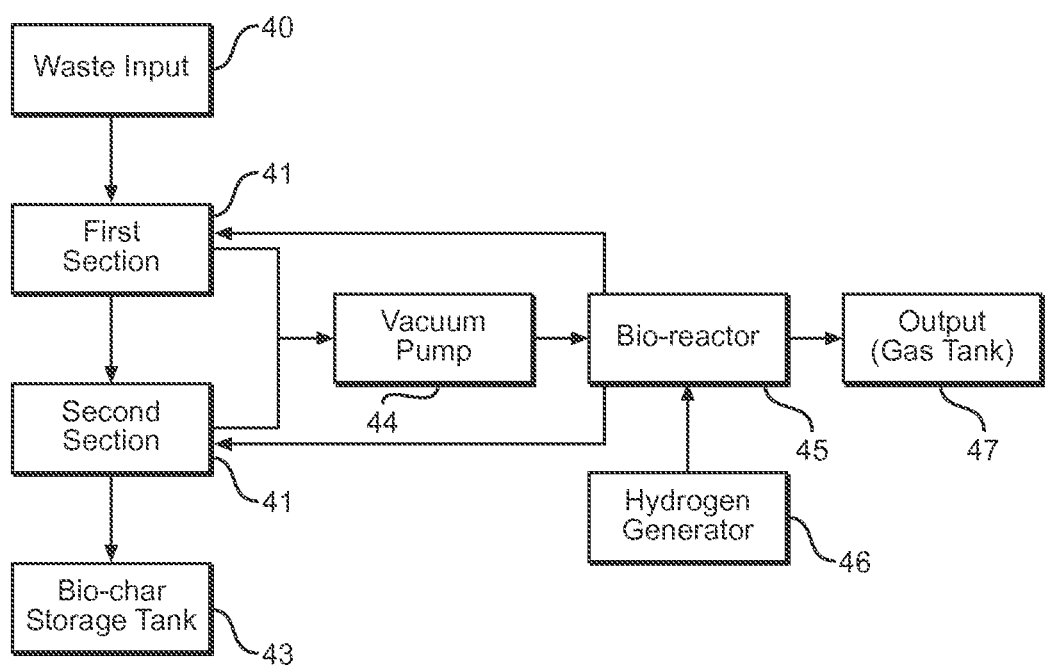
FIG. 2 shows a diagram of the invention.

Referring now to FIG. 2, there is shown a diagram of the method of the invention. This embodiment of the invention is configured to treat municipal solid waste. The process begins with the sorting of the input waste to remove large and bulky items that may cause an obstruction in the heating chamber. The sorted waste is then moved 40 into a first chamber 41, where it is heated to produce syngas. The resulting syngas is removed via a vacuum pump 44, while the biochar byproduct is moved to the second chamber 42. The process is repeated, with more syngas being produced and then removed via the vacuum pump 44, while the biochar is moved to the next stage. In one embodiment of the invention, there is a first heating section and a second heating section. In another embodiment of the invention, there are additional heating sections, each heating section heated to a higher temperature than the previous heating section. The biochar from the last heating section is moved to a biochar storage tank 43. In one embodiment of the invention, the biochar remains are further fed to a pelletizer, a machine that turns biochar into briquettes.

The syngas is moved from the vacuum pump 44 to the bio-reactor 45. Hydrogen is introduced to the bioreactor 45 from a hydrogen generator 46. The hydrogen reacts with the carbon monoxide in the syngas to produce methane and water. The resulting syngas mixture is finally moved to an output gas tank 47. This syngas is then partially used to reheat the heating chambers 41, 42 as well as to generate electricity. In a further embodiment of the invention, the syngas is used as fuel to heat water and create steam, which is used to turn the turbines on an electric generator to create electricity.

The syngas is created through pyrolysis and gasification methods, which yield maximum syngas and minimum bio-oil production in comparison to other methods used to convert waste into energy. Pyrolysis and gasification happen in the absence of oxygen. Oxygen is absent in the heating sections of the invention by the natural consequence of the formation of syngas. This formation naturally exhibits a slight positive pressure relative to the environment, and therefore prevents the inward flow of outside air, pushing out any incoming oxygen. Additionally, all openings disposed on the heating chamber are sealed off from the surrounding environment, preventing surrounding oxygen from entering the heating sections.

The temperatures ranges required for pyrolysis and gasification approximately cover 600-900° C. and 900° C.-1700° C. respectively. The temperatures which are required for efficient pyrolysis and gasification depend on the waste materials. Additionally, differing waste input produces varying amounts of syngas. For example, waste input containing more plastics will produce more syngas, while waste input containing more wood and fiber products will produce more bio-char.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for converting municipal solid waste into energy, comprising:
   (a) sorting the municipal solid waste to remove large and bulky items and moving a sorted waste without large and bulky items into a loading hopper;
   (b) moving the sorted waste without large and bulky items from the loading hopper into a first static bed heating section of a heating chamber, wherein the first static bed heating section further comprises a first door which is controlled by a microprocessor;
   (c) heating the sorted municipal solid waste without large and bulky items to a first temperature, wherein the heating creates a first syngas and a first biochar;
   (d) removing the syngas from the first heating section via a vacuum pump to retain the first biochar;
   (e) transferring the first biochar to a second static bed heating section by opening the first door using the microprocessor, wherein the second static bed heating section further comprises a second door which is controlled by the microprocessor;

(f) heating the first biochar in the second heating section to a second temperature higher than the first temperature, wherein the heating creates a second syngas and a second biochar;

(g) removing the second syngas from the second heating section via the vacuum pump to obtain a third biochar;

(h) cooling and storing the third biochar in a biochar storage tank;

(i) removing the carbon monoxide from the first and second syngas by adding hydrogen to create methane and a syngas without carbon monoxide; and (j) recirculating a portion of the syngas without carbon monoxide to heat the first and second heating sections.

2. The method of claim 1 further comprising (k) burning the remaining portion of the syngas without carbon monoxide to produce electricity by means of an electrical generator.

3. The method of claim 2, wherein the syngas without carbon monoxide is converted to dimethyl ether (DME) $C_2H_6O$ ($CH_3$—O—$CH_3$).

4. The method of claim 2 wherein the large and bulky items are inert materials which have higher melting temperatures than the second temperature.

5. The method of claim 1 further comprising repeating steps (c) to (g) for at least three times in a heating chamber having at least three static bed heating sections.

6. The method of claim 1 wherein the controller opens the first door in order to transfer the first biochar into the second static bed heating section when the temperature inside the static bed heating section reaches a first threshold temperature.

7. The method of claim 1 wherein the controller opens the second door in order to transfer the second biochar into the second static bed heating section when the temperature inside the second static bed heating section reaches a second threshold temperature.

8. The method of claim 1 wherein the step (h) cooling and storing the third biochar in a biochar storage tank further comprising treating the third biochar with water.

* * * * *